Feb. 18, 1964 J. R. BOWMAN 3,121,864
SIGNAL DEVICE

Filed April 23, 1962 2 Sheets-Sheet 1

INVENTOR.
JOSEPH RUSSELL BOWMAN
BY *Hobbs & Caston*

ATTORNEYS

Feb. 18, 1964  J. R. BOWMAN  3,121,864
SIGNAL DEVICE
Filed April 23, 1962  2 Sheets-Sheet 2

INVENTOR.
JOSEPH RUSSELL BOWMAN
BY
Hobbs & Caxton
ATTORNEYS

United States Patent Office 3,121,864
Patented Feb. 18, 1964

3,121,864
SIGNAL DEVICE
Joseph Russell Bowman, 19 S. 4th St., Lafayette, Ind.
Filed Apr. 23, 1962, Ser. No. 189,573
5 Claims. (Cl. 340—283)

The present invention relates to a signal device and more particularly to a portable device which can be placed in various positions and locations to operate when a predetermined condition occurs.

One of the principal objects of the present invention is to provide a fully self-contained signal device which can be installed temporarily or permanently in various positions and locations and easily connected to a member or an element to which the device is to respond and produce a desired signal. This type of device is particularly useful as a signal to a fisherman to indicate a nibble or a catch, and the present device is designed and constructed to be easily mounted on a pole or rig and placed in contact with the line without disturbing or otherwise interfering with the normal use and operation of the equipment. It is therefore another object of the present invention to provide an electric signaling device for producing a sound or other indication when a fish is on the line, the device having therein a sensitive control switch means operated by the tension on the line, which can be readily connected to and disengaged from the line and which permits the line to be reeled and unreeled without resetting or adjusting the switch means or the signal device.

Another object of the invention is to provide an electric fish alarm which is removably clamped to the fishing pole near the handle thereof and easily carried, along with the pole, and used to indicate when a fish is on the line by merely placing the line in contact with a sensing element, and which can be readily rendered inoperative and ineffective momentarily by the fisherman after sounding of the alarm without interfering with his manipulation of the pole and line to catch and land the fish.

A further object of the present invention is to provide a general purpose electric signal or alarm device which can be easily carried from one location to another and placed in operation or set to be operated in response to a desired condition without making any changes or adjustments in the device, and which can be placed in an inconspicuous place remote from the thing or condition to be sensed.

Another object is to provide a versatile and attractive signal device which is highly sensitive to the occurrence of the desired condition or thing to which it is intended to respond, and which is dependable and so constructed and designed that it can be set or placed in the desired position and left for extended periods of time without any adverse effect on its reliability.

Another object of the invention is to provide a device of the aforesaid type which can be used as a burglar alarm adapted to be placed on the door of a hotel or motel room and set to operate whenever the door is opened, and which is sufficiently small and compact that it can be carried in conventional luggage, hand bag or brief case.

Another object of the present invention is to provide a door or window alarm of the aforesaid type which can be hung or otherwise readily installed on or adjacent the door or window without interfering with their use and which can easily be rendered operative or inoperative as required.

Additional objects and advantages of the invention will become apparent from the following description and accompanying drawings, wherein.

Figure 2:
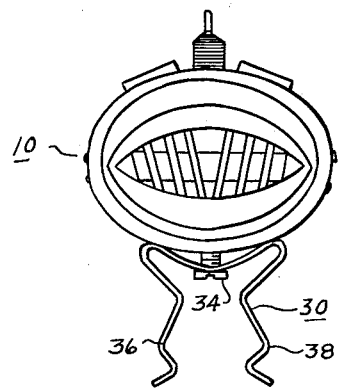
FIGURE 2 is a front elevational view of the signal device shown in FIGURE 1.
Figure 3:
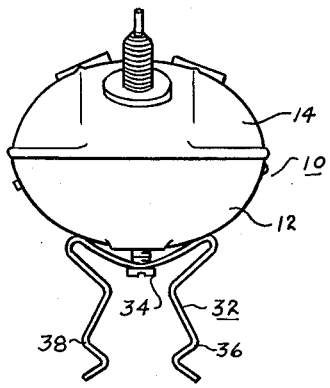
FIGURE 3 is a rear elevational view of the signal device shown in FIGURES 1 and 2.
Figure 1:
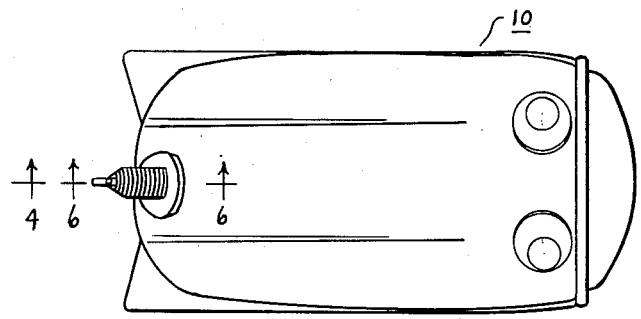
FIGURE 1 is a top plan view of a signal device embodying the present invention.

Referring more specifically to the drawings, numeral 10 designates generally one form of the present signaling device having a body portion 12 and a top portion or cover 14, the cover being pivotally attached to the body portion by a hinge 16 along one side thereof and releasably attached to the other side by a catch or latch 18, the latch consisting of a spring member 20 operated by a button 24 for engaging inwardly projecting lug 26 on the cover. In the embodiment shown in FIGURES 1 through 6, the signaling device is designed for use as a fish alarm and is provided with a pair of clamp means 30 and 32, secured to the underside of body portion 12 by screws 34 extending upwardly through the clamp into the lower part of the body portion. The two legs 36 and 38 of clamps 30 and 32 are resilient and, when placed over a pole or the like, will securely engage the pole and retain the device firmly in position thereon. The two legs of clamps 30 and 32 will also effectively serve as supports for the signaling device whenever it is used for many purposes other than a fish alarm.

Figure 4:
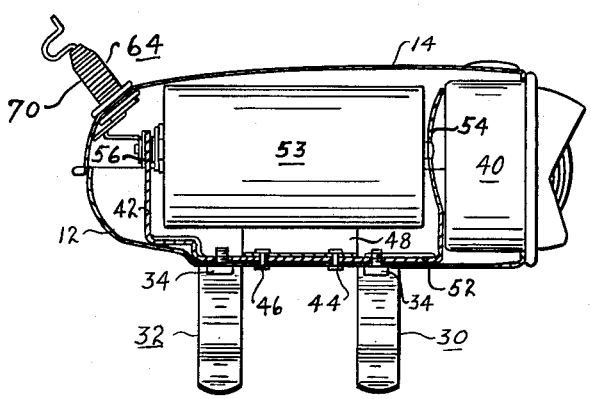
FIGURE 4 is a vertical cross sectional view of the signal device shown in the preceding figures, the section being taken on line 4—4 of FIGURE 1.
Figure 5:
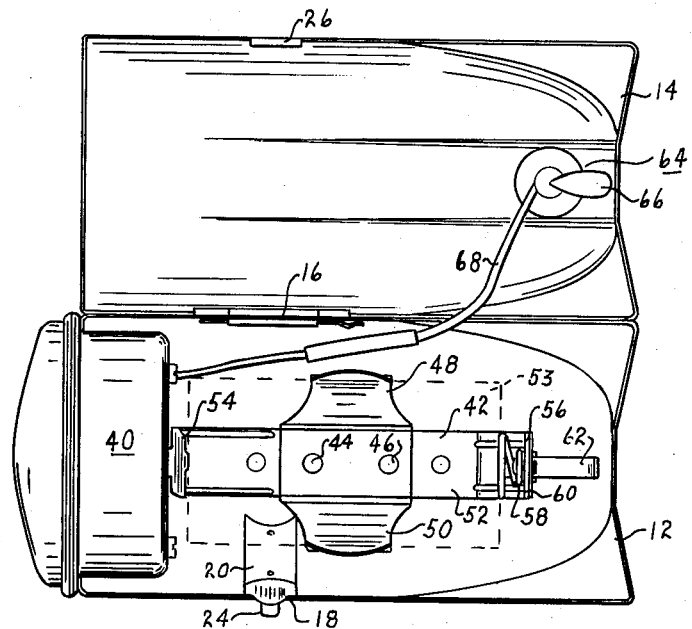
FIGURE 5 is a plan view of the signal device shown in the preceding figures with the cover thereof opened so that the parts forming the device may be seen in detail.

The mechanism for sensing and creating a signal is most effectively illustrated in FIGURES 4 and 5, and consists of a buzzer, bell or the like indicated by numeral 40 mounted in the forward end of body portion 12. The buzzer is of conventional and well known construction and will not be described in detail herein. A battery support bracket 42 is mounted immediately to the rear of buzzer 40 and is secured to the body portion 12 by rivets 44 and 46 extending downwardly therethrough and through the bottom portion. The bracket is also held firmly in place by screws 34 extending upwardly from clamps 30 and 32 through the bottom portion into threaded holes in bracket 42. The battery is held in proper alignment in bracket 42 by clamp members 48 and 50 extending upwardly from opposite sides of base member 52 of bracket 42, the two clamp members being joined to one another at the bottom and secured to base member 52 by rivets 44 and 46. The battery 53, as shown in FIGURE 4, seats in bracket 42 with one end engaging forward member 54 and the other end rear member 56, the forward member 54 directly grounding buzzer 40 to the battery. The rear member 56 consists of a coil spring 58 insulated from member 56 by rubber grommet 60 and connected by a leaf spring, or the like, 62 to the control switch means, designated generally by numeral 64. Contact leaf spring 62 is engaged by contact member 66 of the switch means when cover 14 is in closed and latched position. The complete circuit for the battery which is held in bracket 42 by clamps 48 and 50 consists of spring 58, leaf contact 62, control switch means 64, and lead 68 connecting the switch means to the buzzer, and ground or end member 54 connecting the buzzer with the end of the battery.

Figure 6:
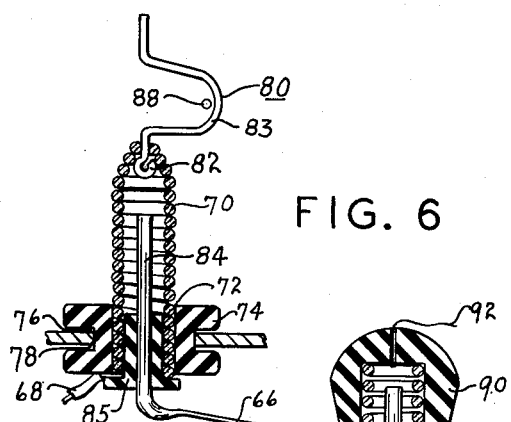
FIGURE 6 is a vertical cross sectional view through one form of control switch means, the section being taken on line 6—6 of FIGURE 1.

One of the principal features of the present electric signal device is the control switch means 64 which, to render the device effective, must be highly sensitive and capable of being easily "set" or placed in operating condition. As shown in FIGURE 6, the switch means is designed to be used in connection with a fishing line, while the fish alarm is mounted on the pole. This switch means consists of a flexible coil spring 70 seated in a hole 72 of rubber grommet 74, the rubber grommet having an annular groove 76 for seating in hole 78 in the upper rear portion of cover 14. The upper end of spring 70 is coiled inwardly to form a substantially closed end for receiving a hook-like member 80 held in place in the upper end by an eye 82 and the curved portion 83 of the hook. A straight contact member or stem 84 is supported in the center of spring 70 by a cylindrical rubber member 85 which fits snugly into the lower end of spring 70 and assists in retaining the spring in position in grommet 74. Spring 70 is connected by lead 68 to the buzzer and stem 84 is connected by contact 66 to contact 62. In the operation of the present switch, the contact between spring 70 and stem 84 is completed by the deflection of spring 70 to one side or the other, causing the coils of the spring to engage the stem and complete the circuit. The sensitivity of the control switch means can be varied to satisfy requirements by varying the length of stem 84 and the flexibility of spring 70.

In the operation of the present signaling device used as a fish alarm, the two clamp members 30 and 32 are placed on the lower portion of the pole adjacent the handle, and the line is placed in hook 80 in the position shown at numeral 88. With the line in this position and held at an angle out of alignment with two fishing line eyes forwardly and rearwardly thereof, any substantial tension on the line causes the line to straighten and pull the hook 80 to one side, causing spring 70 to engage stem 84, thus completing the circuit between the battery and buzzer 40. While the foregoing control switch means is effectively used as a fish alarm sensing element, it can be used advantageously for any number of other purposes to permit the signaling device to serve as an alarm to indicate various conditions. For example, a line may be placed through hook 80 and connected to, for example, a door, such that when the door is moved, the line will be placed under tension causing spring 70 to contact stem 84, thus closing the circuit.

Figure 8:
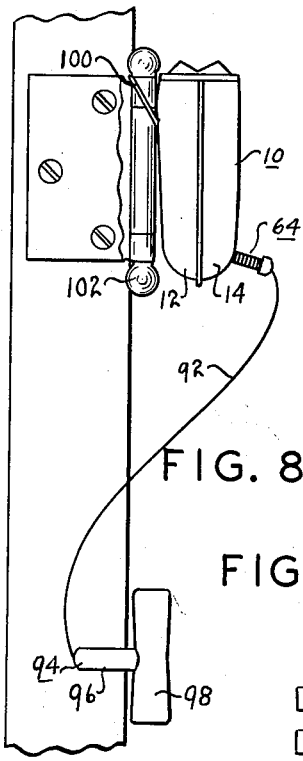
FIGURE 8 is a side elevational view of a modified form of the present signal device, showing the device being used as a burglar alarm mounted on the hinge of a conventional door.
Figure 7:
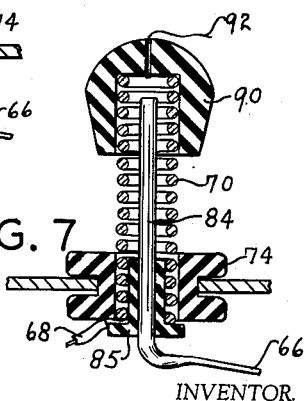
FIGURE 7 is a vertical cross sectional view through a modified form of a control switch means, the section corresponding to the section of FIGURE 6.

In the embodiment of the invention shown in FIGURES 7 and 8, the basic structure of the signaling device is the same as that shown in the preceding embodiments disclosed in FIGURES 1 through 6; consequently, like numerals will be used to refer like parts, and the details of the device will not be described here. This form is intended primarily to function as a burglar alarm and the principal difference between the previously described embodiment and that shown in FIGURES 7 and 8 is in the control switch means 64 which is similar in most respects to the control switch means shown in FIGURE 6, the modification being in the attachment for operating the spring. In this embodiment, spring 70 is a straight cylindrical structure throughout with the upper end thereof enclosed in a rubber cup 90 firmly secured to the spring. The cup 90 has a thread or a highly flexible wire 92 secured at one end firmly to cup 90 and at the other end to a lug 94, the lug consisting of a flat tongue-like member 96 of rubber or rubber-like material and a weighted portion 98. The body of the signaling device is supported by a looped wire 100 secured to the underside of body portion 12 and adapted to be hung on hinge 102 of a door. In the use of the device shown in FIGURES 7 and 8, the signaling device is hung on a hinge, as illustrated in FIGURE 8, and the tongue portion 96 of lug 94 is placed in the crack of the door immediately beneath the hinge. The door is then closed, clamping the tongue portion firmly between the door and door facing and holding lug 94 in a fixed position. When the door is opened, the clamping action of the door and door facing on tongue portion 96 is released, thus permitting lug 94 to fall, thereby placing sufficient weight on spring 70 to deflect it against stem 84. This completes the circuit and produces an alarm to warn anyone in the room that an intruder is entering.

Figure 9:
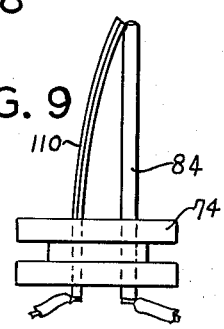
FIGURE 9 is a fragmentary elevational view of a further modified form of the invention.

In a further embodiment a thermostatic switch means may be substituted for the coil spring rendering the signal device an effective fire alarm. A bi-metallic strip 110 of well known construction, as illustrated in FIGURE 9, is arranged to contact stem 84 when the temperature reaches a predetermined degree.

The three forms specifically set forth herein make the present signal device highly versatile and adaptable to a large number of diverse uses in addition to those mentioned specifically herein. While only three embodiments of the present invention have been described in detail herein, various other changes and modifications may be made to suit requirements.

I claim:

1. In a signal device: a control switch means including a rubber grommet having a hole therein, a coil spring in said hole projecting outwardly from the device, a plug in said hole, a stem extending through said plug and centrally within said spring, and a means on the outer end of said spring for moving the spring laterally to make contact with said stem.

2. A signal device comprising a body portion, a battery bracket in said body portion having two end members and two side clamps for receiving a battery, a signal means in said body portion connected to one of said end members, a cover for said body portion, a control switch means on said cover including a rubber grommet having a hole therein, a coil spring secured in said hole and projecting outwardly from said cover, a plug in said hole, a stem extending through said plug centrally within said spring, a means on the outer end of said spring for moving the spring laterally to make contact with said stem, a contact on said stem for connecting said stem with the battery, and a lead connected at one end to said spring and at the other end to said signal means.

3. A signal device comprising a body portion, a battery bracket in said body portion having two end members and two side clamps for receiving a battery, a buzzer means in said body portion connected to one of said end members, the other of said end members having a spring for engaging the battery and a contact connected to said spring, a means for insulating said spring from the respective end member, a cover for said body portion having an opening therein, hinge means for securing one side of said cover to one side of the body portion, a latch means for releasably attaching the other side of said cover to said body portion, a control switch means including a rubber grommet in said opening and having a hole therein, a coil spring secured in said hole and projecting outwardly from said cover, a plug in said hole, a stem extending through said plug centrally within said coil spring, a means on the outer end of said coil spring for moving the spring laterally to make contact with said stem, a contact on said stem for engaging said first mentioned contact when said cover is latched, and a lead connected at one end to said spring and at the other end to said buzzer.

4. A burglar alarm comprising an elongated body portion, a battery bracket in said body portion having two end members and two side clamps for receiving a battery, a buzzer means in one end of said body portion connected to one of said end members, the other of said end members having a spring for engaging the battery and a contact connected to said spring, a means for insulating said spring from the respective end member, a cover for said body portion having an opening therein, hinge means for securing one side of said cover to one side of the body portion, a latch means for releasably attaching the other side of said cover to said body portion, a control switch means including a rubber grommet in said opening and having a hole therein, a coil spring secured in said hole and projecting outwardly from said cover, a plug in said hole, a stem extending through said plug centrally within said spring, a means on the outer end of said spring for moving the spring laterally to make contact with said stem, a contact on said stem for engaging said first mentioned contact when said cover is latched, a lead connected at one end to said spring and at the other end to said buzzer, a loop-shaped means attached to said body for hanging said alarm on a door, a weight means having a resilient tongue portion, and a flexible member connecting said weight means to the means on the outer end of said spring.

5. A burglar alarm comprising a body portion, a battery bracket in said body portion having two end members and two side clamps for receiving a battery, a signal means in said body portion connected to one of said end members, a cover for said body portion having an opening therein, a control switch means including a rubber grommet in said opening and having a hole therein, a coil spring secured in said hole and projecting outwardly from said cover, a plug in said hole, a stem extending through said plug centrally within said spring, a means on the outer end of said spring for moving the spring laterally to make contact with said stem, a contact on said stem for connecting said stem with the battery, a lead connected at one end to said spring and at the other end to said signal means, means attached to said body for hanging said alarm on a door, a weight means having a resilient tongue portion, and a flexible member connecting said weight means to the means on the outer end of said spring.

References Cited in the file of this patent

UNITED STATES PATENTS

| 1,107,767 | Dick | Aug. 18, 1914 |
| 2,208,697 | Kernodle et al. | July 23, 1940 |
| 2,228,120 | Koehler | Jan. 7, 1941 |
| 2,813,940 | Poet | Nov. 19, 1957 |
| 2,930,862 | Samaniego | Mar. 29, 1960 |
| 3,053,949 | Johnson | Sept. 11, 1962 |

FOREIGN PATENTS

| 541,079 | France | July 22, 1922 |
| 995,627 | France | Dec. 5, 1951 |